(12) United States Patent
Kitakami et al.

(10) Patent No.: US 6,938,248 B2
(45) Date of Patent: Aug. 30, 2005

(54) PROGRAM PREPARATION APPARATUS

(75) Inventors: Naoichi Kitakami, Tokyo (JP); Akiya Fukui, Tokyo (JP); Kazuya Takahashi, Tokyo (JP)

(73) Assignees: Renesas Technology Corp., Tokyo (JP); Mitsubishi Electric Semiconductor Application Engineering Corporation, Tokyo (JP)

( * ) Notice: Subject to any disclaimer, the term of this patent is extended or adjusted under 35 U.S.C. 154(b) by 658 days.

(21) Appl. No.: 09/971,683

(22) Filed: Oct. 9, 2001

(65) Prior Publication Data

US 2004/0015922 A1 Jan. 22, 2004

(30) Foreign Application Priority Data

May 18, 2001  (JP) ..................................... P2001-148724

(51) Int. Cl.[7] .................................................. G06F 9/45
(52) U.S. Cl. ...................................... 717/159; 717/141
(58) Field of Search ................. 717/100–113, 136–145, 717/151–164; 714/806–810; 712/233–240

(56) References Cited

U.S. PATENT DOCUMENTS 5,854,935 A * 12/1998 Enomoto .................... 717/159

FOREIGN PATENT DOCUMENTS

| JP | 8-101777 | 4/1996 |
| JP | 9-114676 | 5/1997 |

OTHER PUBLICATIONS

Ye et al., "The Design and Use of SimplePower: A Cycle--Accurate Energy Estimation Tool", ACM, pp.: 340–345, 2000.*
Benini, "System–Level Power Optimization: Techniques and Tools", ACM, pp.: 115–192, Apr. 2000.*

* cited by examiner

*Primary Examiner*—Ted T. Vo
(74) *Attorney, Agent, or Firm*—Oblon, Spivak, McClelland, Maier & Neustadt, P.C.

(57) ABSTRACT

A program preparation apparatus that can reduce power consumption and that can suppress malfunctions and the occurrence of noise by improving software is provided. An assembler prepares a relative object program based on an assembly source program. Next, the assembler changes the order of instructions included in the assembly source program in a range that does not influence the operational results in a CPU and, thereby, prepares another assembly source program so as to prepare a relative object program based on this assembly source program. Next, the assembler finds the respective maximum Hamming distance values between respective instructions for a plurality of relative object programs so that the program of which the maximum Hamming distance value is the lowest is determined as a formal relative object program.

12 Claims, 16 Drawing Sheets

<C SOURCE PROGRAM> signed int sa,sb,sc,sd,se;
se=sa*sb+sc/sd;

F I G . 5
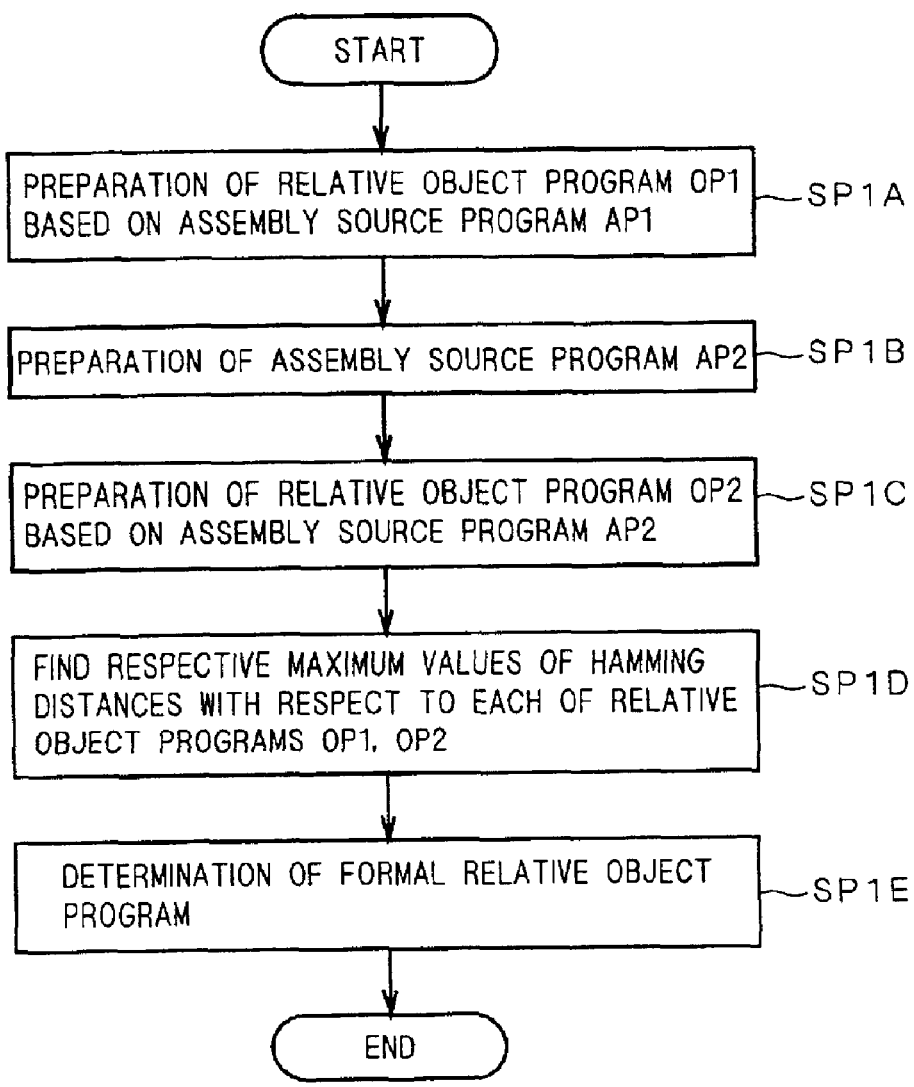

F I G . 6

<ASSEMBLY SOURCE PROGRAM AP1>

```
mov.w   Ram:0[B], R1    ;sa
mul.w   Ram:2[B], R1    ;sb
mov.w   Ram:4[B], R0    ;sc
div.w   Ram:6[B], R0    ;sd
add.w   R0, R1
mov.w   R0, Ram, 8[B]   ;se
```

→

<RELATIVE OBJECT PROGRAM OP1>

```
0011 0110 0000 0000  ⎤ 2
0111 0110 0000 0010  ⎦
                     ⎤ 4
0011 0010 0000 0100  ⎦
                     ⎤ 3
1001 0010 0000 0110  ⎦
                     ⎤ 9
0110 1100 0000 0000  ⎦
                     ⎤ 5
0011 1010 0000 1000  ⎦
```

F I G . 7

<ASSEMBLY SOURCE PROGRAM AP2>

```
mov.w   Ram:4[B], R0    ;sc
div.w   Ram:6[B], R0    ;sd
mov.w   Ram:0[B], R1    ;sa
mul.w   Ram:2[B], R1    ;sb
add.w   R0, R1
mov.w   R0, Ram, 8[B]   ;se
```

→

<RELATIVE OBJECT PROGRAM OP2>

```
0011 0010 0000 0100  ⎤ 3
1001 0010 0000 0110  ⎦
                     ⎤ 5
0011 0110 0000 0000  ⎦
                     ⎤ 2
0111 0110 0000 0010  ⎦
                     ⎤ 4
0110 1100 0000 0000  ⎦
                     ⎤ 5
0011 1010 0000 1000  ⎦
```

F I G . 9

<ADDRESS BIT AB1>

```
INSTRUCTION a : 0111 1111 1111 1100 ⎤
INSTRUCTION b : 0111 1111 1111 1101 ⎦ 1
INSTRUCTION c : 0111 1111 1111 1110 ⎦ 2
INSTRUCTION d : 0111 1111 1111 1111 ⎦ 1
INSTRUCTION e : 1000 0000 0000 0000 ⎦ 16
INSTRUCTION f : 1000 0000 0000 0001 ⎦ 1
INSTRUCTION g : 1000 0000 0000 0010 ⎦ 2
INSTRUCTION h : 1000 0000 0000 0011 ⎦ 1
```

F I G . 1 0

<ADDRESS BIT AB2>

```
INSTRUCTION a : 1000 0000 0000 0000 ⎤
INSTRUCTION b : 1000 0000 0000 0001 ⎦ 1
INSTRUCTION c : 1000 0000 0000 0010 ⎦ 2
INSTRUCTION d : 1000 0000 0000 0011 ⎦ 1
INSTRUCTION e : 1000 0000 0000 0100 ⎦ 3
INSTRUCTION f : 1000 0000 0000 0101 ⎦ 1
INSTRUCTION g : 1000 0000 0000 0110 ⎦ 2
INSTRUCTION h : 1000 0000 0000 0111 ⎦ 1
```

F I G . 1 2

```
                  <ADDRESS BIT AB3>
INSTRUCTION a : 0111 1111 1111 1100 ┐
INSTRUCTION b : 0111 1111 1111 1101 ⇐ ┤1
INSTRUCTION c : 0111 1111 1111 1110 ⇐ ┤2
              : 0111 1111 1111 1111 ⇐ ┤1  <JMP ff00>
              : 1000 0000 0000 0000   │
              : 1000 0000 0000 0001   │
                       ⋮              ┤9
                                      │
INSTRUCTION d : 1111 1111 0000 0000 ⇐ │
INSTRUCTION e : 1111 1111 0000 0001 ⇐ ┤1
INSTRUCTION f : 1111 1111 0000 0010 ⇐ ┤2
INSTRUCTION g : 1111 1111 0000 0011 ⇐ ┤1
INSTRUCTION h : 1111 1111 0000 0100 ⇐ ┘3
```

F I G . 1 5

<ADDRESS BIT AB5>

```
INSTRUCTION a        : 0000 1111 0000 1011
INSTRUCTION b        : 0000 1111 0000 1100
INSTRUCTION c        : 0000 1111 0000 1101
INSTRUCTION d        : 0000 1111 0000 1110
BRANCHING INSTRUCTION: 0000 1111 0000 1111    <JMP f0f0>
                              ⋮
                              ⋮
INSTRUCTION e        : 1111 0000 1111 0000
INSTRUCTION f        : 1111 0000 1111 0001
INSTRUCTION g        : 1111 0000 1111 0010
INSTRUCTION h        : 1111 0000 1111 0011
```

3, 1, 2, 1, 16, 1, 2, 1

F I G . 1 6

```
                        <ADDRESS BIT AB6>
        INSTRUCTION a : 0000 1111 0000 1010 ┐
        INSTRUCTION b : 0000 1111 0000 1011 ← 1
        INSTRUCTION c : 0000 1111 0000 1100 ← 3
        INSTRUCTION d : 0000 1111 0000 1101 ← 1
   DEDICATED INSTRUCTION : 0000 1111 0000 1110 ← 2
   BRANCHING INSTRUCTION : 0000 1111 0000 1111 ← 1  <JMP f0f0>
                              ·
                              ·                   8
                              ·
                      : 0011 0011 0011 0011 ←
                              ·
                              ·                   8
                              ·
        INSTRUCTION e : 1111 0000 1111 0000 ←
        INSTRUCTION f : 1111 0000 1111 0001 ← 1
        INSTRUCTION g : 1111 0000 1111 0010 ← 2
        INSTRUCTION h : 1111 0000 1111 0011 ← 1
```

F I G. 1 7
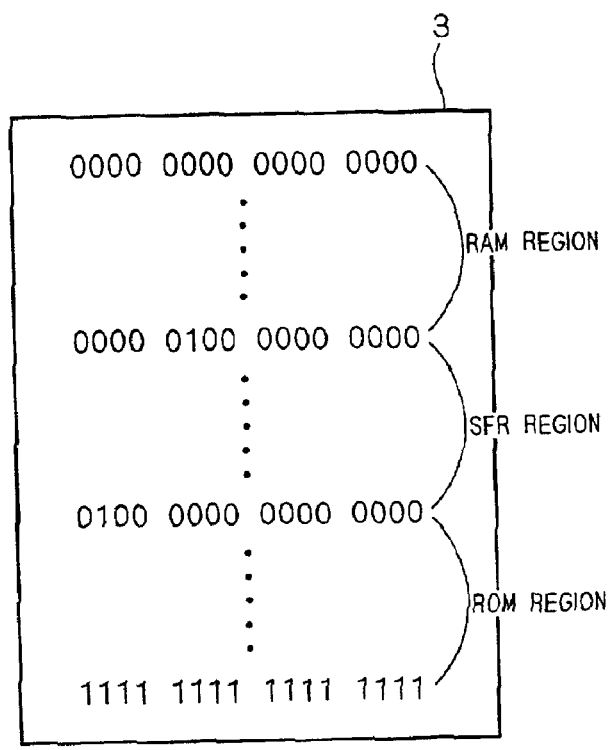
F I G. 1 8
INSTRUCTION x : 1111 1111 1110 1110
INSTRUCTION y : 1111 1111 1110 1111
INSTRUCTION z : 1111 1111 1111 0000     mov.w Ram:0[B], R1

```
INSTRUCTION x       : 1111 1111 1110 1110
INSTRUCTION y       : 1111 1111 1110 1111
DEDICATED INSTRUCTION : 1111 1111 1111 0000
INSTRUCTION z       : 1111 1111 1111 0001    mov.w Ram:0[B],R1
```

F I G . 2 2
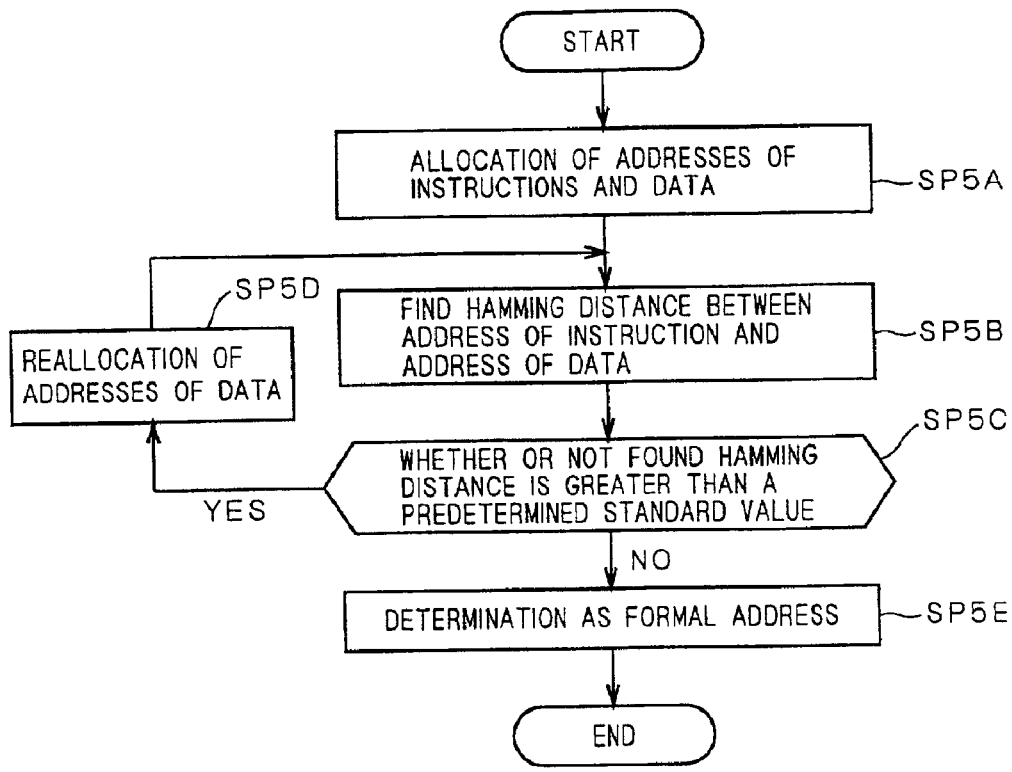
F I G . 2 3
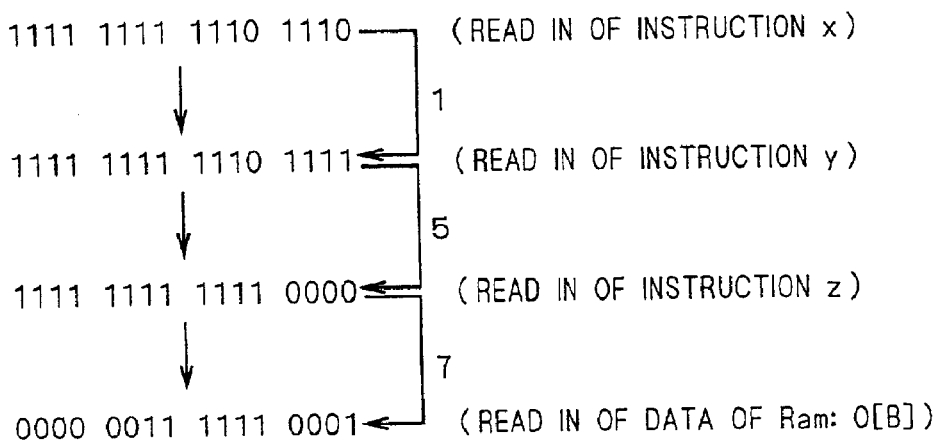

PROGRAM PREPARATION APPARATUS

BACKGROUND OF THE INVENTION

1. Field of the Invention

The present invention relates to a program preparation apparatus, in particular to a software development supporting tool.

2. Description of the Background Art

In general, in the case that a system using a microcomputer is developed, an environment for developing software (development supporting tool) which operates the microcomputer is necessary. As for the development supporting tools, there are a cross tool for preparing a program and an emulator for actually integrating the prepared program into the system so as to debug the program. In the preparation of a program by means of a cross tool, in general a source program is described by using a high level language such as a C language or an assembly language and the source program thereof is compiled into an object program which uses a machine language that the microcomputer can understand. The object program includes a plurality of instructions and addresses are allocated to these instructions respectively, which are stored in a memory of the microcomputer. The microcomputer carries out the object program by sequentially reading out the plurality of instructions stored in the memory. By devising a manner of compiling the source program to the object program, the performance of the microcomputer can be improved even in the case that the same source program is utilized. This is one index representing the performance of the development supporting tool and is, in general, called "compile performance."

Here, a microcomputer is composed by using a plurality of CMOS transistors and in a CMOS transistor at the time when the output load is driven from "H" to "L" or from "L" to "H," that is to say, at the time of switching current flows and power is consumed. Then, the amount of power consumed by a CMOS transistor increases in proportion to the number of times of switching. In addition, since a sudden current change is caused at the time of switching, malfunctions and noise are caused thereby. In particular, when the number of address buses or data buses which switch simultaneously is large, a large amount of current flows suddenly. As a result, a fluctuation in ground potential or power potential transitionally occurs which causes a malfunction or a lowering of performance of the microcomputer. In addition, when noise occurs, not only a malfunction or a lowering of performance in the microcomputer itself occur, but also noise is transmitted to the outside through a bus line or a power line.

In addition, as described above, a microcomputer sequentially reads out a plurality of instructions stored in a memory and, thereby, carries out an object program. Concretely, the CPU designates an address in a memory via an address bus and receives an instruction via a data bus from the address so as to carry out the instruction. A large amount of current flows in the microcomputer at the time of the switching of an address bus or a data bus and, therefore, the switching operation of these buses has a large influence on the amount of the power consumption or noise of the microcomputer. For example, a data bus is connected to a peripheral device or the like, as a common signal line of the system using a microcomputer and the length of the signal line is long and, therefore, the capacitance load is large. Therefore, a large amount of current flows at the time when the data bus switches. Consequently, in the case that the number of times that the potential of the address bus or the data bus changes can be reduced, the amount of power consumed can be reduced and the occurrence of noise can be suppressed accordingly.

Conventionally, however, measures for reducing the power consumption of a microcomputer or for suppressing the occurrence of malfunctions and noise have been carried out by modifying the architecture or hardware of the microcomputer and there is the problem that no measurements are carried out from a software viewpoint.

SUMMARY OF THE INVENTION

The first aspect of the present invention is directed to a program preparation apparatus for preparing an object program utilized by a data processing apparatus having a memory part wherein the object program that includes a plurality of instructions is stored and an operation part for carrying out an operation based on the object program received from the memory part via a data bus. According to this invention, the program preparation apparatus comprises a program preparation part for preparing the object program based on a given source program and the program preparation part determines a specific object program, as a formal object program, of which the maximum value of the Hamming distance between consecutive two of the instructions is of the lowest, from among a plurality of equivalent object programs gained by changing the order of the plurality of instructions.

In addition, the second aspect of this invention according to the first aspect of this invention is directed to a program preparation apparatus, wherein the change in the order of the plurality of instructions by the program preparation part is carried out on, at least, a portion of the object program which is executed in a frequent and repetitive manner.

In addition, the third aspect of this invention according to the first aspect of this invention is directed to a program preparation apparatus, wherein the change in the order of the plurality of instructions by the program preparation part is carried out on, at least, a portion of the object program which relates to the operation of a circuit that is sensitive to noise.

In addition, the fourth aspect of the present invention is directed to a program preparation apparatus for preparing an object program utilized by a data processing apparatus having a memory part wherein the object program including m instructions, where m is $2^n$ or less and is greater than $2^{n-1}$ (m and n are natural numbers), is stored and an operation part for carrying out an operation based on the m instructions sequentially read out from the memory part by sequentially designating k bit addresses within the memory part via k address buses (k is a natural number larger than n). According to this invention, the program preparation apparatus comprises a program preparation part for preparing the object program based on a given source program and an address allocation part for allocating consecutive the m addresses to the m instructions included in the object program prepared by the program preparation part, wherein the address allocation part reallocates the addresses so as to share the value of the highest place in the case that the value of the highest place of the address changes in process of the consecutive m addresses.

In addition, the fifth aspect of this invention according to the fourth aspect is directed to a program preparation apparatus, wherein when reallocating, the address allocation part allocates the addresses so that the values of all of the bits on the higher side of the bit which is (n−1) bits higher than the least significant bit are held in common.

In addition, the sixth aspect of the present invention is directed to a program preparation apparatus for preparing an object program utilized by a data processing apparatus having a memory part where an object program which includes a plurality of instructions is stored and an operation part which carries out an operation based on the plurality of instructions sequentially read out from the memory part by sequentially designating the addresses within the memory part via an address bus. According to this invention, the program preparation apparatus comprises a program preparation part for preparing the object program based on a given source program and an address allocation part for allocating consecutive the plurality of addresses to the plurality of instructions included in the object program prepared by the program preparation part, wherein the address allocation part, in the case that the value of the address of the highest place changes in process of the plurality of consecutive addresses, reallocates the address of the instruction, to which the address immediately after the change is allocated, to the next address or the following.

In addition, the seventh aspect of the present invention is directed to a program preparation apparatus for preparing an object program utilized by a data processing apparatus having a memory part where the object program which includes a plurality of instructions is stored and an operation part which carries out an operation based on the plurality of instructions sequentially read out from the memory part by sequentially designating the addresses in the memory part via an address bus. According to this invention, the program preparation apparatus comprises a program preparation part for preparing the object program based on a given source program and an address allocation part for allocating the plurality of consecutive addresses to the plurality of instructions included in the object program prepared by the program preparation part, wherein the address allocation part, in the case that the value of the address of the highest place changes in the plurality of consecutive addresses in process, reallocates the address so as to insert a dedicated instruction which indicates an access to a predetermined address after accessing the address immediately before the change and before accessing the address immediately after the change.

In addition, the eighth aspect of the present invention is directed to a program preparation apparatus for preparing an object program utilized by a data processing apparatus having a memory part where the object program which includes a plurality of instructions is stored and an operation part which carries out an operation based on the plurality of instructions sequentially read out from the memory part by sequentially designating the addresses in the memory part via an address bus. According to this invention, the program preparation apparatus comprises a program preparation part for preparing the object program based on a given source program and an address allocation part for allocating the addresses respectively, to the plurality of instructions included in the object program prepared by the program preparation part, wherein the plurality of instructions includes a branch instruction which indicates a branch from one instruction to another instruction and the address allocation part, in the case that the Hamming distance between the address before the branch and the address after the branch is larger than a predetermined standard value, reallocates the address so as to insert a dedicated instruction which indicates an access to a predetermined address after accessing the address before the branch and before accessing the address after the branch.

In addition, the ninth aspect of the present invention is directed to a program preparation apparatus for preparing an object program utilized by a data processing apparatus having a memory part where the object program which includes a plurality of instructions is stored and an operation part which carries out an operation based on the plurality of instructions sequentially read out from the memory part by sequentially designating the addresses in the memory part via an address bus. According to this invention, the program preparation apparatus comprises a program preparation part for preparing an object program based on a given source program and an address allocation part for allocating the addresses respectively, to the plurality of instructions included in an object program prepared by the program preparation part, wherein the plurality of instructions includes a predetermined instruction which requires a reference to data and the address allocation part, in the case that the Hamming distance between the address of the predetermined instruction and the address of the data is larger than a predetermined standard value, reallocates the address so as to insert a dedicated instruction which indicates an access to a predetermined address after accessing the address of the predetermined instruction and before accessing the address of the data.

In addition, the tenth aspect of the present invention is directed to a program preparation apparatus for preparing an object program utilized by a data processing apparatus having a memory part where an object program which includes a plurality of instructions is stored and an operation part which carries out an operation based on the plurality of instructions sequentially read out from the memory part by sequentially designating the addresses in the memory part via an address bus. According to this invention, the program preparation apparatus comprises a program preparation part for preparing the object program based on a given source program and an address allocation part for allocating addresses respectively, to the plurality of instructions included in the object program prepared by the program preparation part, wherein the plurality of instructions includes a predetermined instruction which requires a reference to data and the address allocation part, in the case that the Hamming distance between the address of the predetermined instruction and the address of the data is larger than a predetermined standard value, reallocates the address of, at least, either the predetermined instruction or the data so that the Hamming distance becomes a predetermined standard value or less.

In addition, according to the eleventh aspect of this invention, a program preparation apparatus according to any one of the fourth to tenth aspects is characterized in that the reallocation of the addresses by the address allocation part is carried out on, at least, a portion of the object program that is carried out in a frequent and repetitive manner.

In addition, according to the twelfth aspect of this invention, a program preparation apparatus according to any one of the fourth to tenth aspects is characterized in that the reallocation of the addresses by the address allocation part is carried out on, at least, a portion of the object program that operates at a faster rate than other portions.

In addition, according to the thirteenth aspect of this invention, a program preparation apparatus according to any one of the fourth to tenth aspects is characterized in that the reallocation of the addresses by the address allocation part is carried out on, at least, a portion of the object program that is related to the operation of a circuit which is sensitive to noise.

In addition, the fourteenth aspect of the present invention is directed to a program preparation apparatus for preparing an object program utilized by a data processing apparatus having a memory part where the object program which includes a plurality of instructions is stored and an operation part which carries out an operation based on the object program received from the memory part via a data bus. According to this invention, the program preparation apparatus is characterized in that the object program of which the number of data buses being switched simultaneously is the smallest from among a plurality of equivalent object programs gained by changing the order of the plurality of instructions is determined as a formal object program.

In addition, the fifteenth aspect of the present invention is directed to a program preparation apparatus for preparing an object program utilized by a data processing apparatus having a memory part where the object program which includes a plurality of instructions is stored and an operation part which carries out an operation based on the plurality of instructions sequentially read out from the memory part by sequentially designating the addresses in the memory part via an address bus. According to this invention, the program preparation apparatus is characterized in that after the addresses are allocated to the plurality of instructions included in the object program, the addresses are reallocated so that the number of address buses which are simultaneously switched is reduced.

In accordance with the first aspect of this invention, the number of data buses being switched simultaneously can be reduced and, therefore, malfunctions of a data processing apparatus and the occurrence of noise due to a sudden current change can be suppressed.

In addition, according to the second aspect of this invention, malfunctions of a data processing apparatus and the occurrence of noise can be effectively suppressed.

In addition, according to the third aspect of this invention, the lowering of the performance of a data processing apparatus can be effectively suppressed.

In addition, according to the fourth aspect of this invention, the number of address buses being switched simultaneously can be reduced and, therefore, malfunctions of a data processing apparatus and the occurrence of noise due to a sudden current change can be suppressed.

In addition, according to the fifth aspect of this invention, the number of address buses being switched simultaneously can be reduced to the maximum extent.

In addition, according to the sixth aspect of this invention, the number of address buses being simultaneously switched can be reduced and, therefore, malfunctions of a data processing apparatus and the occurrence of noise due to a sudden current change can be suppressed.

In addition, according to the seventh aspect of this invention, the number of address buses being simultaneously switched can be reduced and, therefore, malfunctions of a data processing apparatus and the occurrence of noise due to a sudden current change can be suppressed.

In addition, according to the eighth aspect of this invention, the number of address buses being simultaneously switched can be reduced and, therefore, malfunctions of a data processing apparatus and the occurrence of noise due to a sudden current change can be suppressed.

In addition, according to the ninth aspect of this invention, the number of address buses being simultaneously switched can be reduced and, therefore, malfunctions of a data processing apparatus and the occurrence of noise due to a sudden current change can be suppressed.

In addition, according to the tenth aspect of this invention, the number of address buses being simultaneously switched can be reduced and, therefore, malfunctions of a data processing apparatus and the occurrence of noise due to a sudden current change can be suppressed.

In addition, according to the eleventh aspect of this invention, malfunctions of a data processing apparatus and the occurrence of noise can be effectively suppressed.

In addition, according to the twelfth aspect of this invention, the power consumption of a data processing apparatus can be effectively suppressed.

In addition, according to the thirteenth aspect of this invention, the lowering of the performance of a data processing apparatus can be effectively suppressed.

In addition, according to the fourteenth aspect of this invention, malfunctions of a data processing apparatus and the occurrence of noise due to a sudden current change can be suppressed.

In addition, according to the fifteenth aspect of this invention, malfunctions of a data processing apparatus and the occurrence of noise due to a sudden current change can be suppressed.

The present invention is provided to solve such problems and the purpose thereof is to gain a program preparation apparatus that can reduce power consumption and that can suppress the occurrence of malfunction and noise by improving software without changing hardware.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a flow chart for describing processing by an assembler according to a first preferred embodiment of the present invention;

FIG. 6 is a diagram showing an assembly source program and a relative object program;

FIG. 7 is a diagram showing another assembly source program and another relative object program;

FIG. 9 is a diagram showing an address bit;

FIG. 10 is a diagram showing an address bit to which the invention according to the fifth preferred embodiment of the present invention is applied;

FIG. 12 is a diagram showing an address bit to which the invention according to the ninth preferred embodiment of the present invention is applied;

FIG. 15 is a diagram showing an address bit which has a branch;

FIG. 16 is a diagram showing an address bit to which the invention according to a sixteenth preferred embodiment of the present invention is applied;

FIG. 17 is a diagram schematically showing a memory;

FIG. 18 is diagram showing one example of a program;

FIG. 22 is a flow chart for describing the preparation of a program according to an eighteenth preferred embodiment of the present invention; and FIG. 23 is a diagram showing change of addresses accessed by the CPU at the time when a program according to the eighteenth preferred embodiment of the present invention is carried out.

DESCRIPTION OF THE PREFERRED EMBODIMENTS

First Preferred Embodiment

Figure 1:
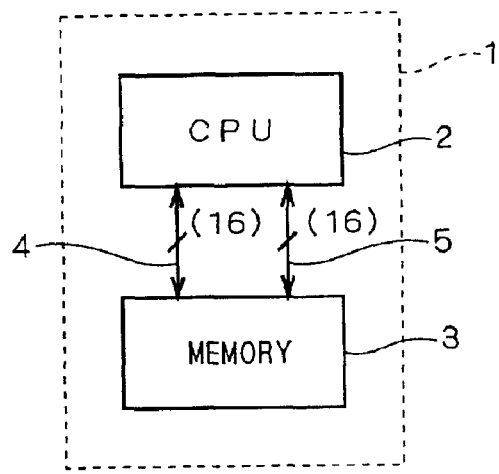
FIG. 1 is a block diagram schematically showing a part a configuration of a microcomputer.

FIG. 1 is a block diagram schematically showing a part of a configuration of a microcomputer. A microcomputer 1 which is a data processing apparatus includes a CPU 2 which is an operation part for carrying out an operation and a memory 3 which is a memory part for storing an object program or other data. The object program includes a plurality of instructions and addresses are allocated respectively to these instructions which are stored in the memory 3. The CPU 2 and the memory 3 are mutually connected through sixteen address buses 4 and sixteen data buses 5. Here, a case is assumed that each instruction included in the object program and an address within the memory 3 are represented respectively by binary digital data of sixteen bits. The microcomputer 1 carries out the object program by sequentially reading out the plurality of instructions stored in the memory 3. Concretely, the CPU 2 designates an address in the memory 3 via the address bus 4 and receives an instruction from the address via the data bus 5 so as to carry out the instruction.

Figure 2:
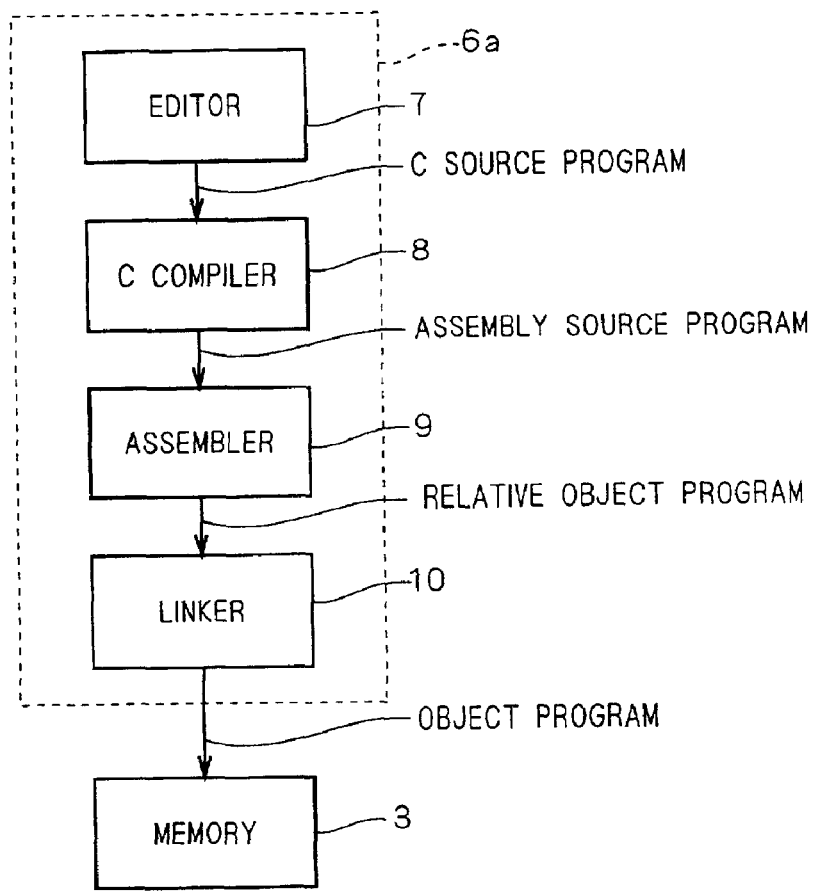
FIG. 2 is a block diagram schematically showing a cross tool.

FIG. 2 is a block diagram schematically showing a cross tool 6a for preparing a program. An editor 7 prepares a C source program described by using a C language. The C source program is compiled by a C compiler 8 to an assembly source program described by using assembler language. The assembly source program is compiled to a relative object program by an assembler 9. Here, the "relative object program" is an object program in the condition where the arrangement information of a memory space such as a branch address is described by relative information. A linker 10 links a plurality of relative object programs and, at the same time, addresses in the memory 3 are allocated to respective instructions and, thereby, the final object program is prepared. The prepared object program is stored in the memory 3 of the microcomputer 1.

Figures 3, 4:
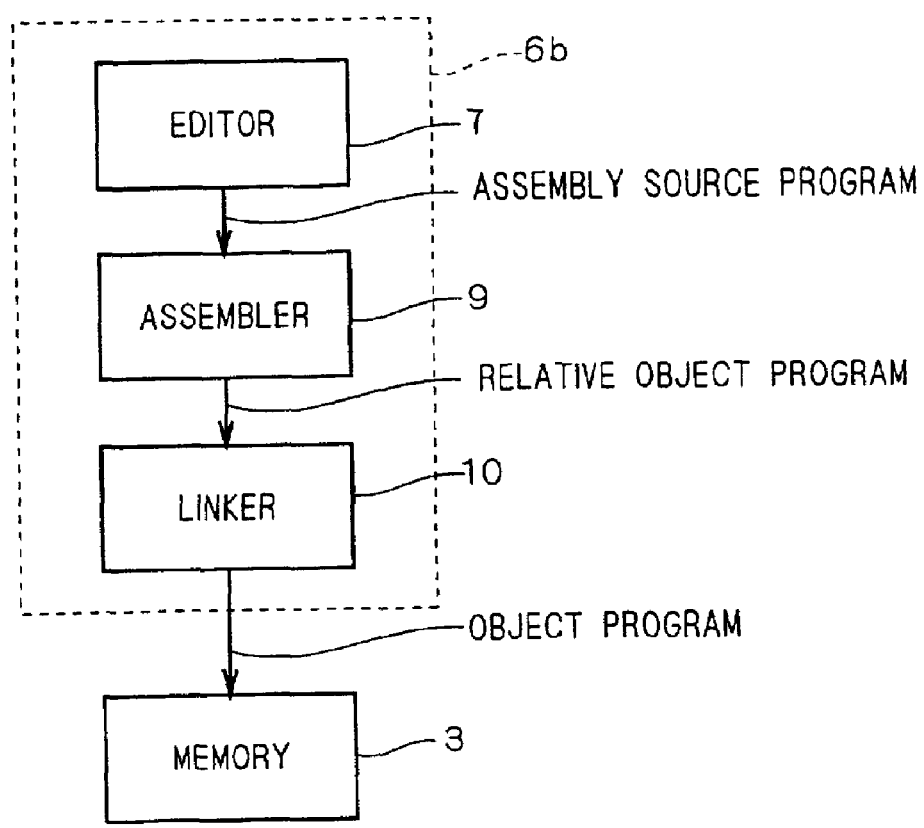
FIG. 3 is a block diagram schematically showing another cross tool.
FIG. 4 is a diagram showing a C source program prepared by an editor.

In addition, FIG. 3 is a block diagram schematically showing another cross tool 6b. An assembly source program is not gained by compiling a C source program but the editor 7 directly prepares an assembly source program.

In the following, a case where the cross tool 6a shown in FIG. 2 is used is cited as an example and a preparation of a program according to the first preferred embodiment is described. FIG. 4 is a diagram showing a C source program prepared by the editor 7. The C source program shown in FIG. 4 is compiled to an assembly source program by the C compiler 8. The assembly source program is compiled to a relative object program by the assembler 9.

FIG. 5 is a flow chart for describing the processing of the assembler 9 according to the first preferred embodiment. First, in Step SP1A the assembler 9 prepares a relative object program OP1 based on an assembly source program (assembly source program AP1) prepared by the C compiler 8. FIG. 6 is a diagram showing the assembly source program AP1 and the relative object program OP1.

Referring back to FIG. 5, next, in Step SP1B, the assembler 9 prepares another assembly source program AP2 by changing the order of instructions included in the assembly source program AP1 in a range where the operational results in the CPU 2 are not influenced. Referring to FIG. 6, since the operational results do not differ even in the case that the set consisting of sa and sb and the set consisting of sc and sd are changed, the assembler 9 prepares the assembly source program AP2 by changing these sets.

Referring back the FIG. 5, next, in Step SP1C the assembler 9 prepares a relative object program OP2 based on the prepared assembly source program AP2. FIG. 7 is a diagram showing the prepared assembly source program AP2 and the relative object program OP2. Even in the case when the CPU 2 carries out the object program prepared based on the relative object program OP1 or the CPU 2 carries out the object program prepared based on the relative object program OP2, the operational results thereof are equal. In this sense, it can be said that the relative object program OP1 and the relative object program OP2 are mutually equivalent.

Next, in Step SP1D, the assembler 9 finds the maximum values respectively, of the Hamming distance between respective instructions with respect to the relative object programs OP1 and OP2 prepared to this point. Referring to FIG. 6, the maximum value of the Hamming distance in the relative object program OP1 is "9" between the instruction in line 4 and the instruction in line 5. In addition, referring to FIG. 7, the maximum value of the Hamming distance in the relative object program OP2 is "5" between the instruction in line 2 and the instruction in line 3 as well as between the instruction in line 5 and the instruction in line 6. Accordingly, the assembler 9 determines that the maximum value of the Hamming distance in the relative object program OP1 is "9" while the maximum value of the Hamming distance in the relative object program OP2 is "5."

Referring back to FIG. 5, next, in Step SP1E the assembler 9 determines one formal relative object program from among a plurality of relative object programs OP1 and OP2 which are mutually equivalent. Concretely, the assembler 9 determines the relative object program, as a formal relative object program, of which the maximum value of the Hamming distance is the lowest. In the case of this example, the assembler 9 determines the relative object program OP2 as a formal relative object program.

In this manner, in accordance with program preparation according to the first preferred embodiment, the assembler 9 prepares a plurality of relative object programs OP1 and OP2 which are mutually equivalent and determines the relative object program, as a formal relative object program, of which the maximum value of the Hamming distance is the lowest from among them. Accordingly, the number of data buses 5 which switch simultaneously can be reduced and, therefore, malfunctions and noise occurrence in the microcomputer due to a sudden current change can be suppressed.

Here, though in the above description a cycle where a bus is utilized by carrying out an instruction is omitted, this has no basic influence on the above described effects.

In addition, though in the above description the case is described where an assembly source program is prepared based on a C source program described by using a C language, the assembly source program may be directly prepared by the editor 7 as shown in FIG. 3 or may be prepared based on a program described by using another high level language.

Second Preferred Embodiment

In the above first preferred embodiment, the invention is described wherein a plurality of relative object programs which are mutually equivalent are prepared by changing the order of the instructions and the relative object program of which the maximum value of the Hamming distance is the lowest from among them is determined as a formal relative object program. In a program preparation according to the second preferred embodiment, the invention according to the above described first preferred embodiment is applied at least to a portion of one program which is carried out in a frequent and repetitive manner. For example, it is applied to a portion where the same program is carried out numerous times in a repetitive manner such as a sub routine. This may, of course, be applied to the entire program.

In this manner, in accordance with the program preparation according to the second preferred embodiment, by applying the invention according to the above described first preferred embodiment to the program, at least in the part where the frequency of being carried out is high, malfunctions of the microcomputer and the occurrence of noise can be effectively suppressed.

Third Preferred Embodiment

In the above first preferred embodiment, the invention is described wherein a plurality of relative object programs which are mutually equivalent are prepared by changing the order of the instructions and the relative object program of which the maximum value of the Hamming distance is the lowest from among them is determined as a formal relative object program. In a program preparation according to the second preferred embodiment, the invention according to the above described first preferred embodiment is applied at least to a part of the program which operates at a higher speed than other parts. Some programs include parts which do not always operate at a high speed but are usually in a standby condition or in a condition of operating at a low speed and convert to a condition of temporarily operating at a high speed due to some event and return to the original condition after processing is completed. Usually, when a program operates at a high speed, power consumption is high and, therefore, in the case that a program of the part which operates at a high speed includes an address of which the address change is large, the power consumption thereof becomes additionally greater. Therefore, in the third preferred embodiment, the invention according to the above described first preferred embodiment is applied to a part of the program which operates at a high speed. This may, of course, be applied to the entire program.

In this manner, in accordance with the program preparation according to the third preferred embodiment, by applying the invention according to the above described first preferred embodiment to at least the part of the program which operates at a high speed, the power consumption of a microcomputer can be effectively suppressed.

Fourth Preferred Embodiment

In the above first preferred embodiment, the invention is described wherein a plurality of relative object programs which are mutually equivalent are prepared by changing the order of the instructions and the relative object program of which the maximum value of the Hamming distance is the lowest from among them is determined as a formal relative object program. In a program preparation according to the fourth preferred embodiment, the invention according to the above described first preferred embodiment is applied at least to a part of the program which relates to the operation of a circuit sensitive to noise. Some microcomputers are of the type which incorporate an analog circuit such as an AD converter. In addition, there is a type where an analog IC is connected outside of the microcomputer. In general, an analog circuit easily receives the effects of noise and, for example, when an AD converter receives the effects of noise the precision of the AD conversion deteriorates. Therefore, in the fourth preferred embodiment the invention according to the above described first preferred embodiment is applied to the part of a program with respect to the operation of a circuit which easily receives the effects of noise. This may, of course, be applied to the entire program.

In this manner, in accordance with the program preparation according to the fourth preferred embodiment, by applying the invention according to the above described first preferred embodiment to at least the part of program with respect to the operation of a circuit which easily receives the effects of noise, the lowering of the performance of a microcomputer can be effectively suppressed.

Fifth Preferred Embodiment

As described above, an object program includes a plurality of instructions and addresses are respectively allocated to these instructions by the linker 10 and they are stored in the memory 3. In addition, the CPU 2 designates an address in the memory 3 via the address bus 4 and reads out an instruction from the address so as to carry out the instruction. Then, by sequentially reading out a plurality of instructions stored in the memory 3, the object program is carried out. Accordingly, depending on to which addresses in the memory 3 a plurality of instructions included in the object program are allocated, the pattern differs where the potential of the address bus 4 changes at the time when the CPU 2 designates an address in the memory 3. In the fifth preferred embodiment the addresses in the memory 3 which are allocated to a plurality of instructions of the object program are adjusted by the linker 10 in order that the potential change of the address bus 4 does not become great.

Figure 8:
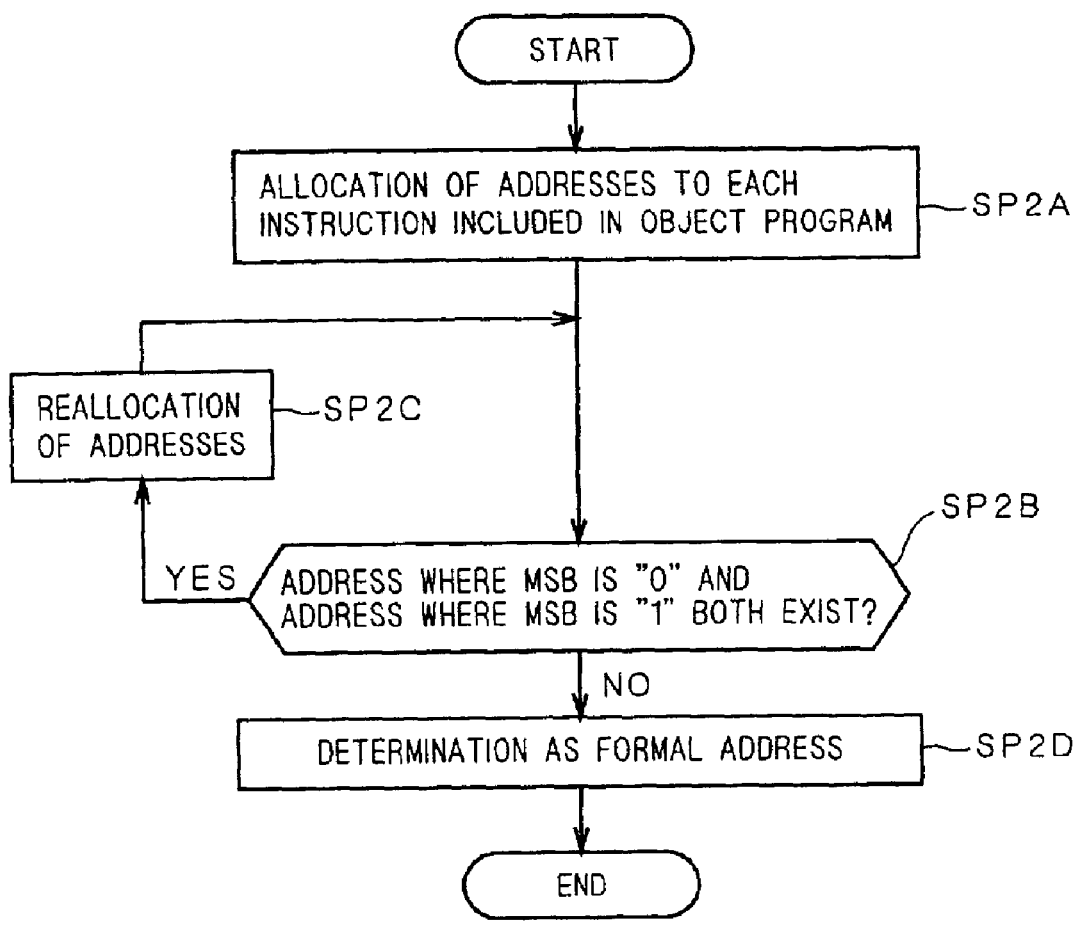
FIG. 8 is a flow chart for describing processing by a linker according to a fifth preferred embodiment of the present invention.

FIG. 8 is a flow chart for describing the processing of the linker 10 according to the fifth preferred embodiment. First, in Step SP2A, the linker 10 allocates addresses in the memory 3 to a plurality of instructions included in the prepared object program. Strictly speaking, an address in the memory 3 is allocated to the head instruction and addresses of the second and later instructions are automatically allocated so as to follow the address of the head instruction. FIG. 9 is a diagram showing the address bit AB1 which has been allocated in Step SP2A. Here, the case where the object program is composed of eight instructions of instruction a to instruction h is cited as an example. For example, an address of "0111 1111 1111 1111" in the memory 3 is allocated to instruction d and an address of "1000 0000 0000 0000" in the memory 3 is allocated to instruction e.

Referring back to FIG. 8, next, in Step SP2B the linker 10 judges whether or not both the address where the MSB (most significant bit) is "0" and the address where the MSB is "1" exist with respect to all of the addresses to which instruction a to instruction h are allocated.

In the case that the judgment result in Step SP2B is "YES," the procedure goes to Step SP2C and the linker 10 reallocates the address of the head instruction a. Each of the addresses of the second and later instructions b to h are automatically allocated so as to follow the address of the head instruction a. In the case of the address bit AB1 shown in FIG. 9, an address where the MSB is "0" and an address where the MSB is "1" both exist and the addresses may therefore be reallocated. Then, the operations in Step SP2C and in Step SP2B are repeated until the judgment result in Step SP2B becomes "NO."

In the case that the judgment result in Step SP2B is "NO," the procedure goes to Step SP2D and the linker 10 determines the address as a formal address. FIG. 10 is a diagram showing the address bit AB2 which has been determined as a formal address. The MSBs of instruction a to instruction h are all "1."

The maximum value of the Hamming distance of the address bit AB1 is "16" between instruction d which is the last instruction where the MSB is "0" and instruction e which is the first instruction where the MSB is "1" while the maximum value of the Hamming distance of the address bit AB2 is "3."

In this manner in accordance with the program preparation according to the fifth preferred embodiment, in the case that an address where the MSB is "0" and an address where the MSB is "1" both exist in the plurality of addresses allocated to the plurality of instructions included in one object program, the linker 10 changes the addresses so that only one of the addresses where the MSB is either "0" or "1" exists and determines the addresses after the change as formal addresses. Accordingly, since the number of address buses 4 that switch simultaneously can be reduced, malfunctions of the microcomputer and the occurrence of noise due to a sudden current change can be suppressed.

Here, though in the above description a cycle where a bus is utilized by carrying out an instruction is omitted, it has no basic influence on the above described effects.

In addition, in the above description the linker 10 allocates an address to each instruction so that each value of the MSB of a plurality of instructions included in one object program becomes the same. However, an address may be allocated so that the values of the highest place instead of the value of the MSB becomes the same (in other words, an increase or decrease in place does not occur in process of a plurality of consecutive addresses). For example, in the case that the address of one instruction is "0000 1111 1111 1111" and the address of the next instruction is "0001 0000 0000 0000," an increase in place has occurred. Here, "the highest place" in this case is the place three bits lower than the MSB.

In addition, in the above description the linker 10 allocates an address to each instruction so that the MSBs of a plurality of instructions included in one object program become the same. In the case that eight ($=2^n$:n is 3) instructions are included in one object program, for example, addresses are allocated so that the values of all bits on the side higher than the bit that is two ($=n-1$) bits higher than the LSB (least significant bit) as shown in FIG. 10 become the same and, thereby, the number of address buses 4 which switch simultaneously can be reduced to the maximum extent.

Sixth Preferred Embodiment

In the above described fifth preferred embodiment, the invention is described wherein addresses are determined, as formal addresses, which are allocated so that either address where the MSB is "0" or "1" exits. In the program preparation according to the sixth preferred embodiment, based on the same effects as the above described second preferred embodiment, the invention according to the above described fifth preferred embodiment is applied to, at least, a portion of one program which is carried out in a frequent and repetitive manner. This may, of course, be applied to the entire program.

In this manner, in accordance with the program preparation according to the sixth preferred embodiment, malfunctions of the microcomputer and the occurrence of noise can be effectively suppressed by applying the invention according to the above described fifth preferred embodiment to, at least, the part of the program of which the frequency of implementation high.

Seventh Preferred Embodiment

In the above described fifth preferred embodiment, the invention is described wherein addresses are determined, as formal addresses, which are allocated so that either address where the MSB is "0" or "1" exits. In the program preparation according to the seventh preferred embodiment, based on the same effects as the above described third preferred embodiment, the invention according to the above described fifth preferred embodiment is applied to, at least, a part which operates at a faster speed than other parts in the program. This may, of course, be applied to the entire program.

In this manner, in accordance with the program preparation according to the seventh preferred embodiment, the power consumption of the microcomputer can be effectively suppressed by applying the invention according to the above described fifth preferred embodiment to, at least, the part of the program that operates at a high speed.

Eighth Preferred Embodiment

In the above described fifth preferred embodiment the invention is described wherein the addresses are determined, as formal addresses, which are allocated so that either address where the MSB is "0" or "1" exist. In the program preparation according to the eighth preferred embodiment, based on the same effects as the above described fourth preferred embodiment, the invention according to the above described fifth preferred embodiment is applied to, at least, a part of the program with respect to the operation of a circuit that is sensitive to noise. This may, of course, be applied to the entire program.

In this manner, in accordance with the program preparation according to the eighth preferred embodiment, the lowering of the performance of a microcomputer can be effectively suppressed by applying the invention according to the above described fifth preferred embodiment to, at least, the part of the program with respect to the operation of a circuit that is sensitive to noise.

Ninth Preferred Embodiment

In the ninth preferred embodiment, based on the same effects as in the above fifth preferred embodiment, the addresses in the memory 3 allocated to a plurality of instructions of the object program are adjusted by the linker 10 so that the potential change of the address bus 4 does not become large.

Figure 11:
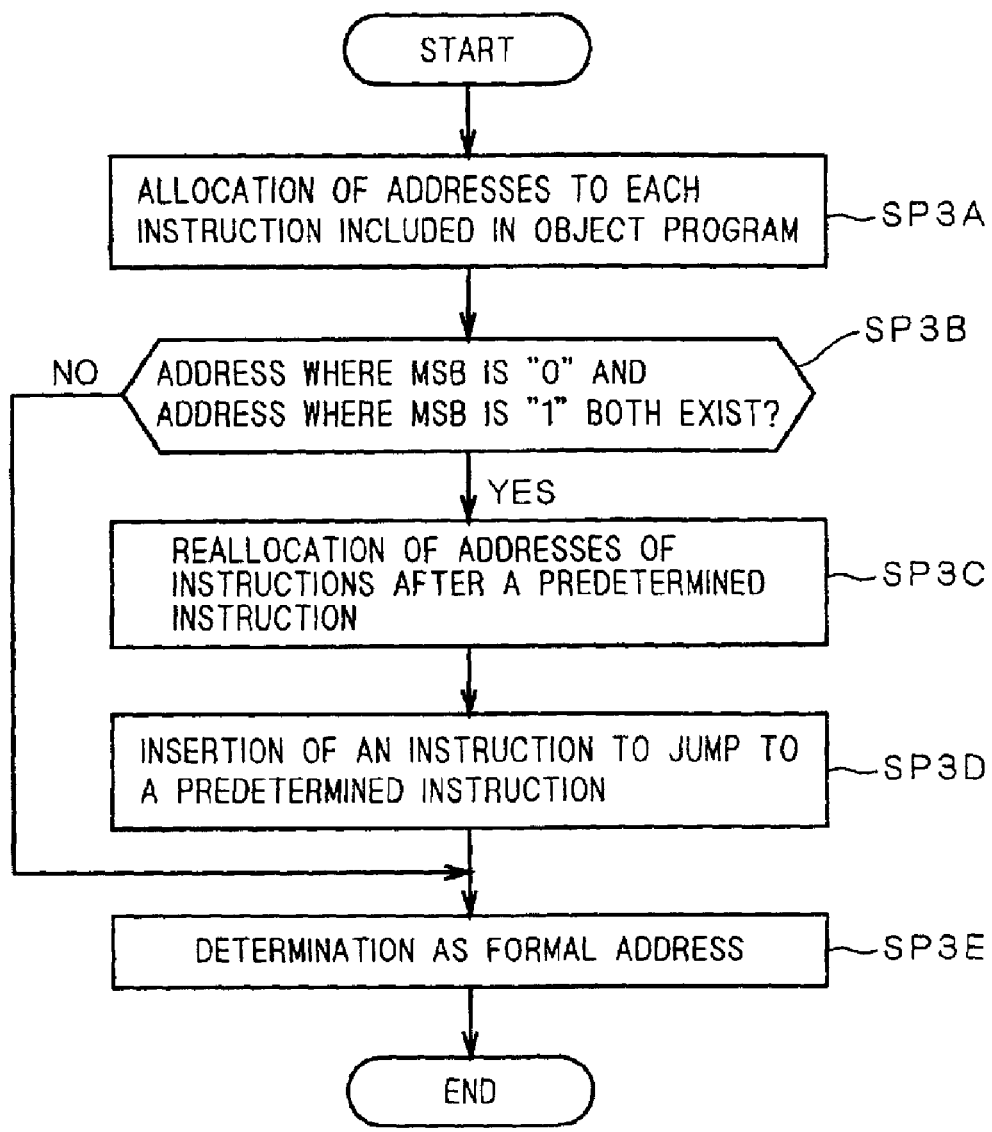
FIG. 11 is a flow chart for describing processing by a linker according to a ninth preferred embodiment of the present invention.

FIG. 11 is a flow chart for describing the processing of the linker 10 according to the ninth preferred embodiment. First, in Step SP3A, the linker 10 allocates the addresses in the memory 3 to a plurality of instructions included in the prepared object program. Strictly speaking, an address in the memory 3 is allocated to the head instruction and addresses of the second and later instructions are automatically allocated so as to follow the address of the head instruction.

Next, in Step SP3B, the linker 10 judges whether or not an address where the MSB is "0" and an address where the MSB is "1" both exist with respect to all of the addresses to which instruction a to instruction h are allocated.

In the case that the judgment result in Step SP3B is "YES," the procedure goes to the Step SP3C and the linker 10 reallocates the addresses of instructions after a predetermined instruction. Here, the "predetermined instruction" is the last instruction where the MSB is "0" (instruction d corresponds to this in the address bit AB1 shown in FIG. 9). As for a new address of the above described predetermined instruction, an arbitrary address after "1000 0000 0000 0001" may be allocated. Preferably this may be allocated to an address of which the upper bit is the same as of the address of "0111 1111 1111 1111." Each address of instruction e to instruction h is automatically allocated so as to follow the address of instruction d.

Next, in Step SP3D, the linker 10 inserts into the address of "0111 1111 1111 1111" an instruction to jump to a new address of instruction d.

Next, in Step SP3D, the linker 10 determines the address as a formal address. In addition, in the case that the judgment result in Step SP3B is "NO," the procedure also goes to Step SP3D and the linker 10 determines the address as a formal address. FIG. 12 is a diagram showing the address bit AB3 which has been determined as a formal address. As a new address of instruction d "1111 1111 0000 0000" is allocated and an instruction to jump to a new address of instruction d is inserted into the address of "0111 1111 1111 1111."

The maximum value of the Hamming distance of the address bit AB1 shown in FIG. 9 is "16" between instruction d that is the final instruction where the MSB is "0" and the first instruction e where the MSB is "1" while the maximum value of the Hamming distance of the address bit AB3 is "9" between the final address where the MSB is "0" and a new address of instruction d.

In this manner, in accordance with the program preparation according to the ninth preferred embodiment, in the case that an address where the MSB is "0" and an address where the MSB is "1" both exist in a plurality of addresses that have been allocated to a plurality of instructions included in one object program, the linker 10 reallocates the addresses of the instruction after a predetermined instruction so that the Hamming distance becomes smaller and determines the addresses as formal addresses by inserting an instruction to jump to a new address of this predetermined instruction. Accordingly, the number of address buses 4 that switch simultaneously can be reduced and, therefore, malfunctions of the microcomputer and the occurrence of noise due to a sudden current change can be suppressed.

Here, though in the above description a cycle where a bus is utilized by carrying out an instruction is omitted, this has no basic influence on the above described effects.

In addition, since pipeline processing is usually carried out in a microcomputer, several cycles are necessary before an instruction is carried out and, in the case that no bus is utilized during that time, the next instruction is read in advance. Though in the ninth preferred embodiment the case is described wherein no pipeline processing is carried out, the present invention according to the ninth preferred embodiment can, of course, be applied to a microcomputer where pipeline processing is carried out by inserting a branch instruction into a portion where pipeline processing is assumed.

Tenth Preferred Embodiment

In the above described ninth preferred embodiment the invention is described wherein the addresses of instructions after a predetermined instruction are reallocated and the address into which a jump instruction is inserted is determined as a formal address. In the program preparation according to the tenth preferred embodiment based on the same effects as in the above described second preferred embodiment, the invention according to the above described ninth preferred embodiment is applied to, at least, a portion of one program which is carried out in a frequent and repetitive manner. This may, of course, be applied to the entire program.

In this manner, in accordance with the program preparation according to the tenth preferred embodiment, malfunctions of the microcomputer and the occurrence of noise can be effectively suppressed by applying the invention according to the above described ninth preferred embodiment to, at least, a part of a program of which the frequency of being carried out is high.

Eleventh Preferred Embodiment

In the above described ninth preferred embodiment the invention is described wherein the addresses of instructions after a predetermined instruction are reallocated and the address into which a jump instruction is inserted is determined as a formal address. In the program preparation according to the eleventh preferred embodiment based on the same effects as in the above described third preferred embodiment, the invention according to the above described ninth preferred embodiment is applied to, at least, a part of a program which operates at a faster speed than other parts. This may, of course, be applied to the entire program.

In this manner, in accordance with the program preparation according to the eleventh preferred embodiment, the power consumption of a microcomputer can be effectively suppressed by applying the invention according to the above described ninth preferred embodiment to, at least, a part of a program which operates at a high speed.

Twelfth Preferred Embodiment

In the above described ninth preferred embodiment the invention is described wherein the addresses of instructions after a predetermined instruction are reallocated and the address into which a jump instruction is inserted is determined as a formal address. In the program preparation according to the twelfth preferred embodiment based on the same effects as in the above described fourth preferred embodiment, the invention according to the above described ninth preferred embodiment is applied to, at least, a part of a program with respect to the operation of a circuit that is sensitive to noise. This may, of course, be applied to the entire program.

In this manner, in accordance with the program preparation according to the twelfth preferred embodiment, the lowering of the performance of a microcomputer can be effectively suppressed by applying the invention according to the above described ninth preferred embodiment to, at least, a part of a program with respect to the operation of a circuit that is sensitive to noise.

Thirteenth Preferred Embodiment

In the thirteenth preferred embodiment, based on the same effects as in the above described fifth preferred embodiment, the addresses in the memory 3 allocated to a plurality of instructions of an object program are adjusted by the linker 10 so that a potential change of the address bus 4 does not become large.

Figure 13:
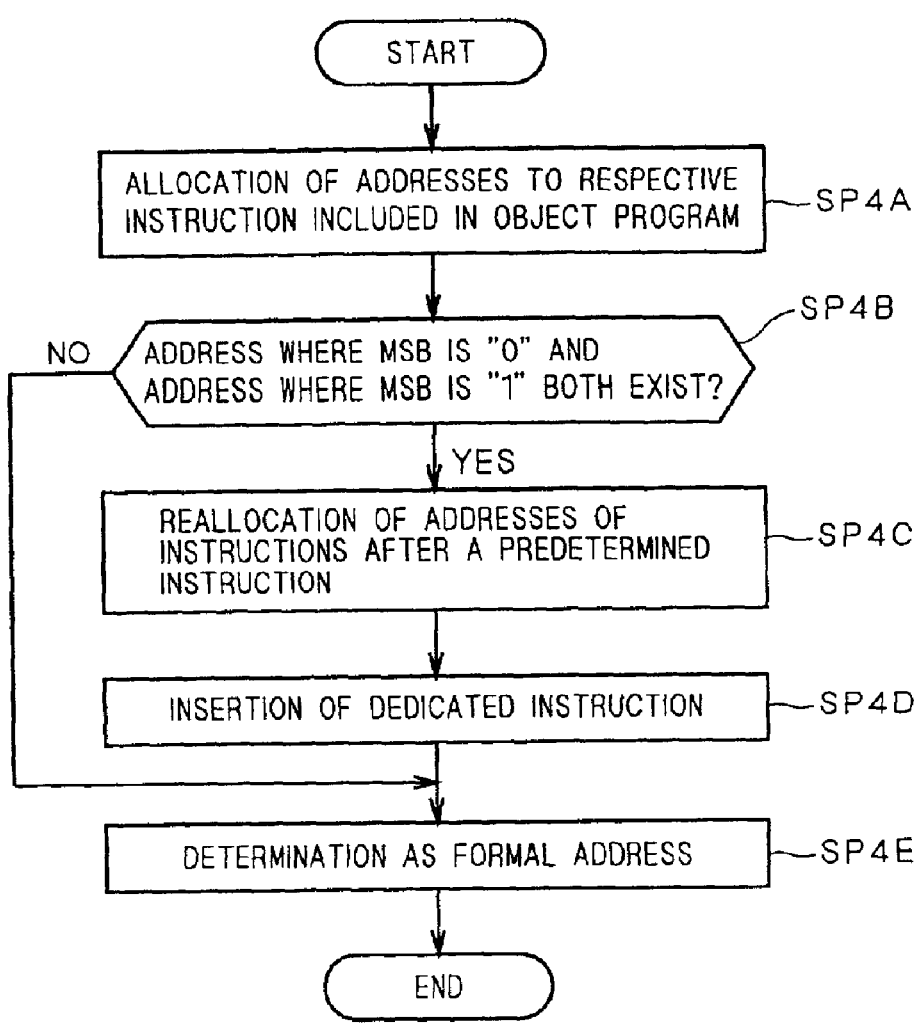
FIG. 13 is a flow chart for describing processing by a linker according to a thirteenth preferred embodiment of the present invention.

FIG. 13 is a flow chart for describing the processing of the linker 10 according to the thirteenth preferred embodiment. First, in Step SP4A, the linker 10 allocates the address in the memory 3 to a plurality of instructions included in the prepared object program. Strictly speaking, an address in the memory 3 is allocated to the head instruction and addresses of the second and later instructions are automatically allocated so as to follow the address of the head instruction.

Next, in Step SP4B, the linker 10 judges whether or not an address where the MSB is "0" and an address where the MSB is "1" both exist with respect to all of the addresses to which instruction a to instruction h are allocated.

In the case that the judgment in Step SP4B is "YES," the procedure goes to Step SP4C and the linker 10 downwardly shifts, one by one, the addresses of instructions after a predetermined instruction. Here the "predetermined instruction" is the final instruction where the MSB is "0" (instruction d corresponds to this in the address bit AB1 shown in FIG. 9). Concretely, the linker 10 reallocates the address of instruction d from "0111 1111 1111 1111" to "1000 0000 0000 0000." Each address of instruction e to instruction h is automatically allocated so as to follow the address of instruction d.

Next, in Step SP4D, the linker 10 inserts a predetermined dedicated instruction into the address of "0111 1111 1111 1111." Here, the "dedicated instruction" is an instruction for the CPU 2 which designates an access to a particular address. The address to which access is designated by the dedicated instruction is an address of which the Hamming distance vis-à-vis the address of "0111 1111 1111 1111" is approximately "7" to "9." For example, an access to the address of "0000 0000 1111 1111" is designated by the dedicated instruction. Even in the case that some other instruction has already been stored in the address of "0000 0000 1111 1111," the CPU 2 only accesses the address and does not carry out the instruction.

Figure 14:
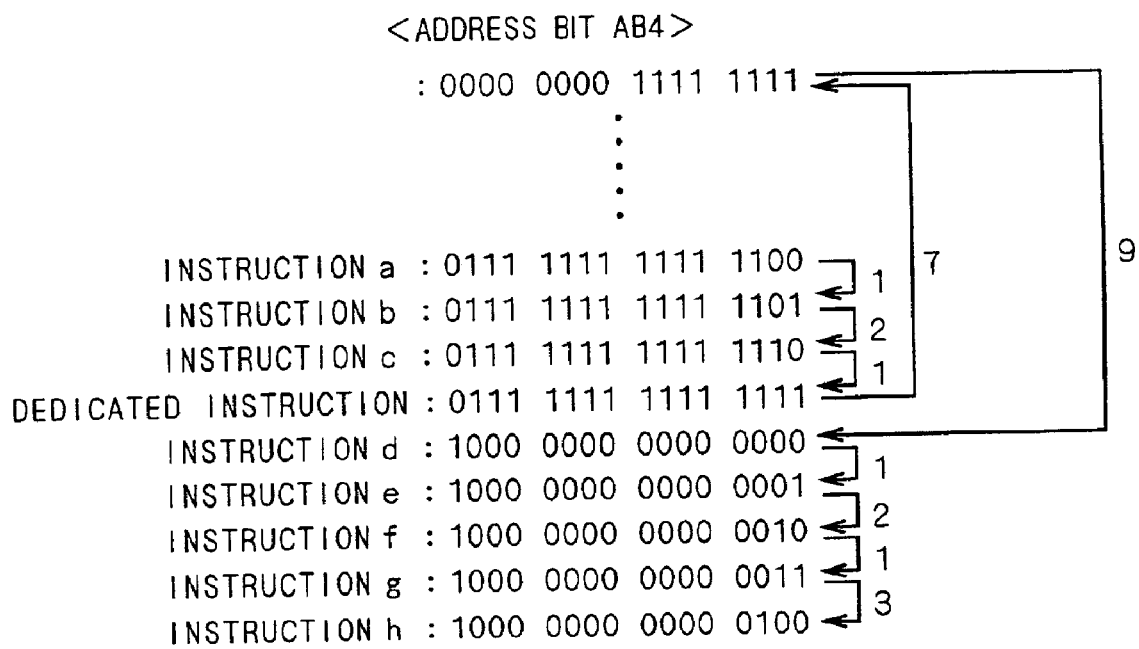
FIG. 14 is a diagram showing an address bit to which the invention according to the thirteenth preferred embodiment of the present invention is applied.

Next, in Step SP4E, the linker 10 determines the address as a formal address. In addition, even in the case that the judgment in Step SP4B is "NO," the procedure goes to Step SP4E and the linker 10 determines the address as a formal address. FIG. 14 is a diagram showing the address bit AB4 that has been determined as a formal address. As a new address of instruction d "1000 0000 0000 0000" is allocated and a dedicated instruction which designates an access to the address of "0000 0000 1111 1111" is inserted into the address of "0111 1111 1111 1111." After accessing the address of "0000 0000 1111 1111" according to the dedicated instruction, the CPU 2 access the address of "1000 0000 0000 0000" and carries out a read out of instruction d.

The maximum value of the Hamming distance of the address bit AB1 shown in FIG. 9 is "16" between instruction d which is the final instruction where the MSB is "0" and instruction e which is the first instruction where the MSB is "1" while the maximum value of the Hamming distance of the address bit AB4 is "9" between the address of "0000 0000 1111 1111" that has been designated by the dedicated instruction and a new address of instruction d of "1000 0000 0000 0000."

In this manner, in accordance with the program preparation according to the thirteenth preferred embodiment, in the case that an address where the MSB is "0" and an address where the MSB is "1" both exist in a plurality of addresses that have been allocated to a plurality of instructions included in one object program, the linker 10 reallocates the addresses of the instruction after a predetermined instruction so that the Hamming distance becomes smaller and at the same time determines the addresses as formal addresses by inserting a dedicated instruction which designates an access to a particular address. Accordingly, the number of address buses 4 that switch simultaneously can be reduced and, therefore, malfunctions of the microcomputer and the occurrence of noise due to a sudden current change can be suppressed.

Here, though in the above description a cycle where a bus is utilized by carrying out an instruction is omitted, this has no basic influence on the above described effects.

In addition, since pipeline processing is usually carried out in a microcomputer, several cycles are necessary before an instruction is carried out and, in the case that no bus is utilized during that time, the next instruction is read in advance. Though in the thirteenth preferred embodiment the case is described wherein no pipeline processing is carried out, the present invention according to the thirteenth preferred embodiment can, of course, be applied to a microcomputer where pipeline processing is carried out by inserting a dedicated instruction into a portion where pipeline processing is assumed.

Fourteenth Preferred Embodiment

In the above thirteenth preferred embodiment the invention is described wherein the addresses of instructions are reallocated after a predetermined instruction and the address into which a dedicated instruction is inserted is determined as a formal address. In the preparation of a program according to the fourteenth preferred embodiment, based on the same effects as in the above described second preferred embodiment, the invention according the above described thirteenth preferred embodiment is applied to, at least, a portion of one program which is carried out in a frequent and repetitive manner. This may, of course, be applied to the entirety of the program.

In this manner, in accordance with the preparation of a program according to the fourteenth preferred embodiment, by applying the invention according to the above described thirteenth preferred embodiment to, at least, a part of a program of which the frequency of being carried out is high, microcomputer malfunctions and the occurrence of noise can be effectively suppressed.

Fifteenth Preferred Embodiment

In the above thirteenth preferred embodiment the invention is described wherein the addresses of instructions are reallocated after a predetermined instruction and the address into which a dedicated instruction is inserted is determined as a formal address. In the preparation of a program according to the fifteenth preferred embodiment, based on the same effects as in the above described third preferred embodiment, the invention according the above described thirteenth preferred embodiment is applied to, at least, a part of a program with respect to the operation of a circuit which is sensitive to noise. This may, of course, be applied to the entire program.

In this manner, in accordance with the preparation of a program according to the fifteenth preferred embodiment, by applying the invention according to the above described thirteenth preferred embodiment to, at least, a part of a program with respect to the operation of a circuit which is sensitive to noise, the lowering of the performance of a microcomputer can be effectively suppressed.

Sixteenth Preferred Embodiment

In the above thirteenth preferred embodiment, the invention is described wherein the addresses of instructions are reallocated after a predetermined instruction and the address into which a dedicated instruction is inserted is determined as a formal address. In the preparation of a program according to the sixteenth preferred embodiment, the invention according the above described thirteenth preferred embodiment is applied at the time of the branching of a program. Concretely, in the case that a program branches into an address wherein the Hamming distance is large vis-à-vis the address of the program from which branching starts, a dedicated instruction is inserted immediately before the branching. Whether or not the process of inserting the dedicated instruction is judged depending on whether or not the Hamming distance between the address of the program from which branching starts and the address of the program to which the branching goes is larger than a predetermined reference value. This predetermined reference value is, for example, "8" in the case of sixteen bits.

FIG. 15 is a diagram showing the address bit AB5 which has a branch. In the address of "0000 1111 0000 1111" an instruction of branching to the address of "1111 0000 1111 0000" is stored. Accordingly, the Hamming distance between the addresses before and after branching becomes "16" and microcomputer malfunctions and noise occur due to a sudden current change.

FIG. 16 is a diagram showing the address bit AB6 to which the invention according to the sixteenth preferred embodiment is applied. A dedicated instruction is inserted immediately before the branching instruction. This dedicated instruction is an instruction which instructs the CPU 2 to jump to the address of the program to which the branch goes after accessing a particular address in the case that the next branching instruction is received. As for the particular address indicated by the dedicated instruction, an address is adopted so that the Hamming distance vis-à-vis the address of the program from which the branching starts and the Hamming distance vis-à-vis the address of the program to which the branching goes both become approximately "7" to "9" (in the case of sixteen bits). In the example shown in FIG. 16 the address of "0011 0011 0011 0011" is designated as the above described particular address. In the case of this example, the Hamming distances vis-à-vis the address of the program from which the branching starts and the address of the program to which the branching goes both become "8."

In this manner, in accordance with the preparation of a program according to the fifteenth preferred embodiment, in the case that the program branches into the address of which the Hamming distance vis-à-vis the address of the program from which the branching starts is large, a dedicated instruction which indicates an access to a particular address is inserted into the address immediately before the branching instruction. Accordingly, the number of address buses 4 which switch simultaneously at the time of branching can be reduced and, therefore, microcomputer malfunctions and the occurrence of noise due to a sudden current change can be suppressed.

Seventeenth Preferred Embodiment

FIG. 17 is a diagram schematically showing the memory 3. The memory 3 has a RAM region, an SFR (special function register) region and a ROM region partitioned by predetermined addresses. Data are stored in the RAM region, data with respect to a peripheral function incorporated in the microcomputer are stored in the SFR region and an instruction is stored in a ROM region. The closer that the portion of a stored instruction is to the address "1111 1111 1111 1111" within the ROM region, the greater is the difference between the upper address of the instruction and the data stored in the RAM region or in the SFR region.

FIG. 18 is a diagram showing one example of a program. Instructions x to z are stored in the ROM region shown in FIG. 17. Instruction z stored in the address "1111 1111 1111 0000" is an instruction which requires the read out of data stored in the address "0000 0000 0000 1000" in the RAM region.

Figures 19, 20:
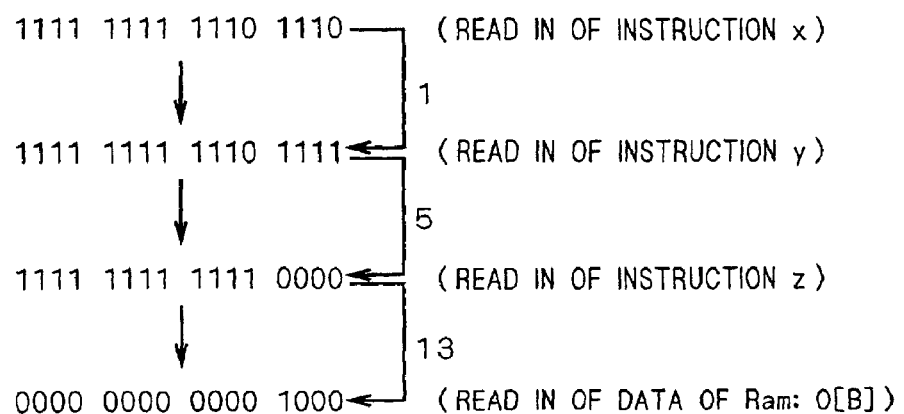
FIG. 19 is a diagram showing the change of addresses within a memory accessed by the CPU at the time when the program shown in FIG. 18 is carried out.
FIG. 20 is a diagram showing one example of a program to which the invention according to a seventeenth preferred embodiment of the present invention is applied.

FIG. 19 is a diagram showing the change of the address in the memory 3 accessed by the CPU 2 at the time when the program shown in FIG. 18 is carried out. At the time of reading the data of Ram: 0[B], after instruction z has been read, a large address change is caused of which the Hamming distance is "13." Accordingly, microcomputer malfunctions and noise occur due to a sudden current change. In the preparation of a program according to the seventeenth preferred embodiment, the invention according to the above described thirteenth preferred embodiment is applied at the time of data access when the instruction is carried out. Concretely, in the case that an instruction is carried out while referring to data of which the address change is great, a dedicated instruction is inserted immediately before the instruction.

FIG. 20 is a diagram showing one example of a program to which the invention according to the seventeenth preferred embodiment is applied. Immediately before instruction z, which causes a great address change at the time of data access, a dedicated instruction is inserted. This dedicated instruction is an instruction which instructs the CPU 2 to access a particular address before accessing the address of the data in the case that an instruction accompanying a data reference is received the next time. As for the particular address that is designated by the dedicated instruction, an address is adopted so that the Hamming distance vis-à-vis the address of the above described instruction accompanying the data reference and the Hamming distance vis-à-vis the address of the referenced data are both approximately "7" to "9" (in the case of sixteen bits). For example, as the above described particular address, the address of "0000 0011 1111 0000" in the RAM region is designated.

Figure 21:
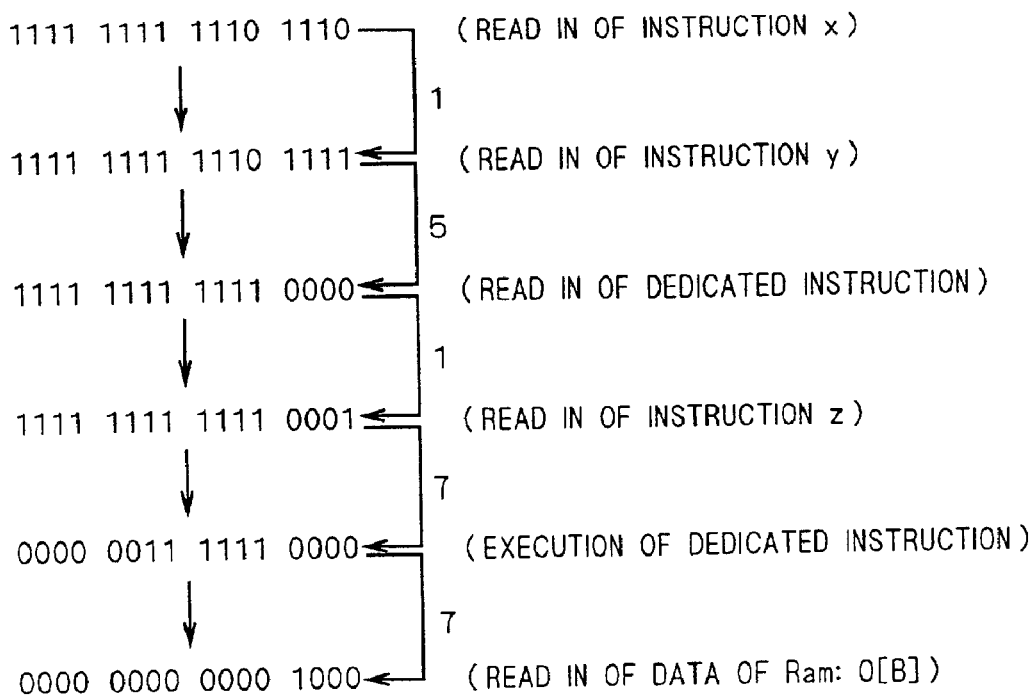
FIG. 21 is a diagram showing the change of addresses within the memory accessed by the CPU at the time when the program shown in FIG. 20 is carried out.

FIG. 21 is a diagram showing an address change in the memory 3 which the CPU 2 accesses at the time when the program shown in FIG. 20 is carried out. In comparison with FIG. 19 it can be seen that an execution of the dedicated instruction is added between a read in of instruction z and a read in of the data of Ram: 0[B]. The maximum value of the Hamming distance is "7" between a read in of instruction z and an execution of the dedicated instruction as well as between an execution of the dedicated instruction and a read in of the data of Ram: 0[B].

In this manner, in accordance with the preparation of a program according to the seventeenth preferred embodiment, in the case that an execution of a certain instruction accompanies a reference to data of which the address change is large, a dedicated instruction which designates access to a particular address is inserted into the address immediately before this instruction. Accordingly, the number of address buses 4 which switch simultaneously at the time of referring to the data can be reduced and, therefore, microcomputer malfunctions and the occurrence of noise due to a sudden current change can be suppressed.

Eighteenth Preferred Embodiment

In the above described seventeenth preferred embodiment, in the case that an execution of a certain instruction accompanies a reference to data of which the address change is large, a dedicated instruction which designates an access to a particular address is inserted and, thereby, the number of address buses 4 which switch simultaneously at the time of referring to data is reduced. In the eighteenth preferred embodiment, in place of the insertion of a dedicated instruction, the addresses of the data are reallocated so as to make the Hamming distance small and, thereby, the number of address buses 4 which switch simultaneously is reduced.

FIG. 22 is a flow chart for describing the preparation of a program according to the eighteenth preferred embodiment. First, in Step SP5A, the linker 10 allocates the addresses of instructions and data in the memory 3. Here, in some cases, data are not stored in the memory 3 incorporated in the microcomputer 1 but, rather, data are stored in an external memory connected to the microcomputer 1. In such a case, addresses of data in the external memory are allocated.

Next, in Step SP5B, the linker 10 finds the Hamming distance between the address of the instruction and the address of data which are referred to by carrying out the instruction. Next, in Step SP5C, the linker 10 judges whether or not the Hamming distance found in Step SP5B is larger than a predetermined reference value. The predetermined reference value is, for example, "8" in the case of sixteen bits.

In the case that the judgment in Step SP5C is "YES," the procedure goes to Step SP5D and the linker 10 reallocates the addresses of the data. Then, the process from Step SP5B to Step SP5D is carried out repeatedly until the judgment result in Step SP5C becomes "NO." Here, instead of reallocation of the addresses of the data, the addresses of the instructions may be reallocated. That is to say, the addresses of at least the instructions or of the data may be reallocated.

On the other hand, in the case that the judgment in Step SP5C is "NO," the procedure goes to Step SP5E and the linker 10 determines the address as a formal address.

FIG. 23 is a diagram showing the change of the address which the CPU 2 accesses at the time when the program according to the eighteenth preferred embodiment is carried out. The data of Ram: 0[B] to which the address of "0000 0000 0000 1000" is allocated are converted to the address of "0000 0011 1111 0001" and the maximum value of the Hamming distance is "7."

In this manner, in accordance with the preparation of a program according to the eighteenth preferred embodiment, in the case that an execution of a certain instruction accompanies a reference to data of which the address change is large, the addresses of either instructions or data are reallocated so that the Hamming distance between the instructions and the data becomes of a predetermined reference value or less. Accordingly, the number of address buses 4 which switch simultaneously at the time that the data are referred to can be reduced and, therefore, microcomputer malfunctions and the occurrence of noise due to a sudden current change can be suppressed.

Here, though in the above case where no pipeline processing has been carried out is described, the invention according to the eighteenth preferred embodiment can, of course, be applied to a microcomputer where pipeline processing is carried out.

While the invention has been shown and described in detail, the foregoing description is in all aspects illustrative and not restrictive. It is therefore understood that numerous other modifications and variations can be devised without departing from the scope of the invention.

What is claimed is:

1. A program preparation apparatus for preparing an object program utilized by a data processing apparatus, said data processing apparatus having a memory part wherein said object program that includes a plurality of instructions is stored, and an operation part for carrying out an operation based on said object program received from said memory part via a data bus, said program preparation apparatus comprising a program preparation part comfigured to prepare said object program based on a source program, wherein said program preparation part is configured to determine a specific object program, as a formal object program, for which a maximum value of a Hamming distance between two consecutive instructions of said plurality of instructions is lowest, from among a plurality of equivalent object programs obtained by changing an order of said plurality of instructions.

2. The program preparation apparatus according to claim 1, wherein said program preparation part is configured to change the order of said plurality of instructions on at least a portion of said object program that is executed in a frequent and repetitive manner.

3. The program preparation apparatus according to claim 1, wherein said program preparation part is configured to change the order of said plurality of instructions on at least a portion of said object program that relates to an operation of a circuit that is sensitive to noise.

4. A program preparation apparatus for preparing an object program utilized by a data processing apparatus, said data processing apparatus having (1) a memory part wherein said object program including m instructions is stored, where m is $2^n$ or less and m is greater than $2^{n-1}$ (m and n are natural numbers), and (2) an operation part for carrying out an operation based on said m instructions sequentially read out from said memory part by sequentially designating addresses within said memory part via address buses, said program preparation apparatus comprising:

a program preparation part configured to prepare said object program based on a source program; and an address allocation part configured to allocate m consecutive addresses to said m instructions included in said object program prepared by said program preparation part, wherein said address allocation part is configured to reallocate said m consecutive addresses so that each address shares a value of a highest bit position, when said value of the highest bit position is initially different among said m consecutive addresses.

5. The program preparation apparatus according to claim 4, wherein said address allocation part is configured to allocate said m consecutive addresses so that values of all bits on a higher side of a bit that is (n–1) bits higher than a least significant bit are held in common.

6. The program preparation apparatus according to claim 4, wherein said address allocation part is configured to reallocate said m consecutive addresses, for at least a portion of said object program that is carried out in a frequent and repetitive manner.

7. The program preparation apparatus according to claim 4, wherein said address allocation part is configured to reallocate said m consecutive addresses for at least a portion of said object program that operates at a faster rate than other portions.

8. The program preparation apparatus according to claim 4, wherein said address allocation part is configured to reallocate said said m consecutive addresses for at least a portion of said object program that is related to an operation of a circuit that is sensitive to noise.

9. A program preparation apparatus for preparing an object program utilized by a data processing apparatus, said data processing apparatus having a memory part wherein an object program that includes a plurality of instructions is stored, and an operation part that carries out an operation based on said plurality of instructions sequentially read out from said memory part by sequentially designating addresses within said memory part via an address bus, said program preparation apparatus comprising:

a program preparation part configured to prepare said object program based on a source program; and an address allocation part configured to allocate a plurality of consecutive addresses to said plurality of instructions included in said object program prepared by said program preparation part, wherein, when a value of a highest bit position of a first address associated with a first instruction is different than a corresponding value of a second address associated with a preceding instruction, said address allocation part is configured to reallocate an address of said first instruction to a next address or a following address.

10. The program preparation apparatus according to claim 9, wherein said address allocation part is configured to reallocate said consecutive addresses for at least a portion of said object program that is executed in a frequent and repetitive manner.

11. The program preparation apparatus according to claim 9, wherein said address allocation part is to reallocate said consecutive addresses for at least a portion of said object program that operates at a faster rate than other portions.

12. The program preparation apparatus according to claim 9, wherein said address allocation part is configured to reallocate said consecutive addresses for at least a portion of said object program that is related to an operation of a circuit that is sensitive to noise.

* * * * *